T. YOCHUM.
RESILIENT WHEEL.
APPLICATION FILED JUNE 24, 1912.
1,084,055.
Patented Jan. 13, 1914.
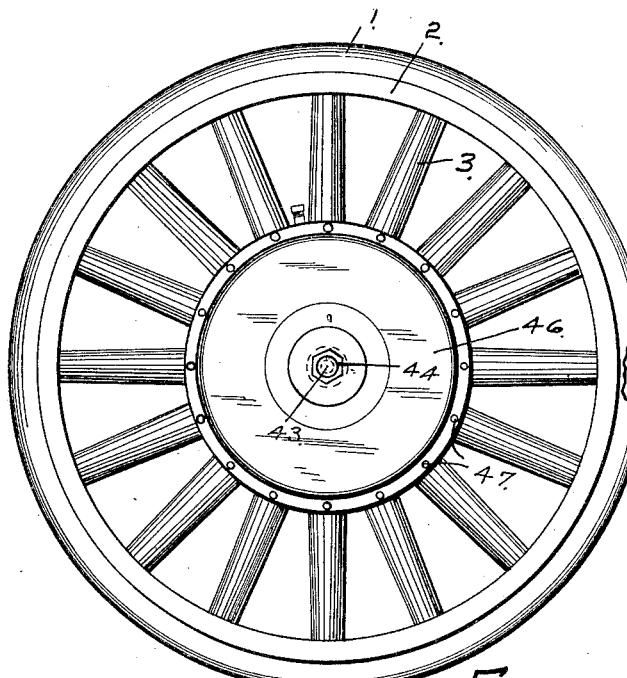
Fig. 1.
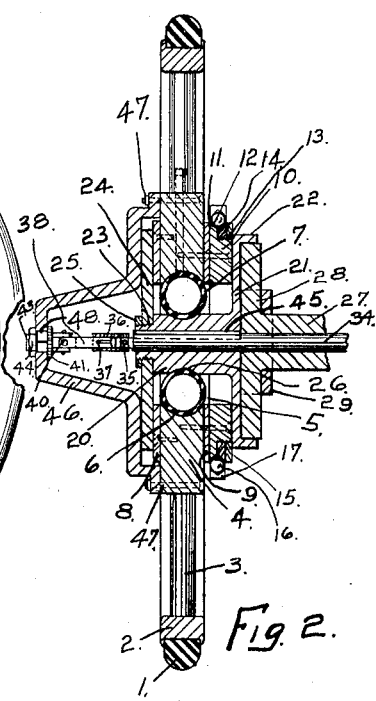
Fig. 2.
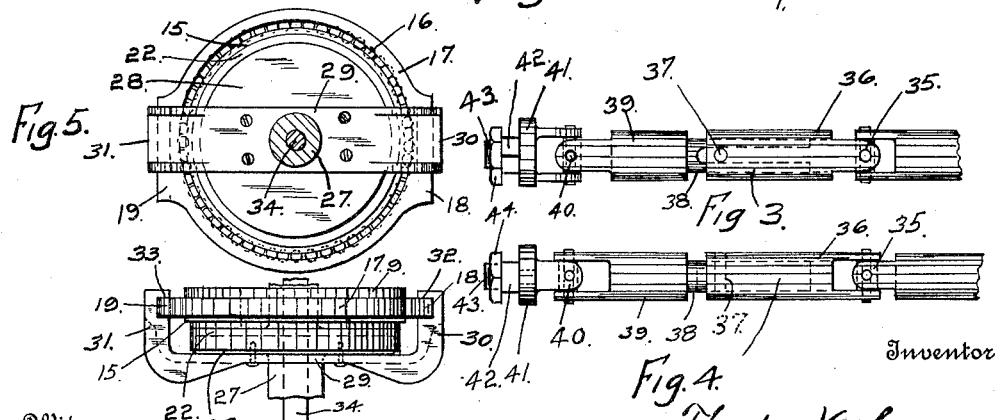
Witnesses
WM. Gillespie
A. L. Phelps
Inventor
Theodore Yochum
By
C. C. Shepherd
Attorney

UNITED STATES PATENT OFFICE.

THEODORE YOCHUM, OF COLUMBUS, OHIO.

RESILIENT WHEEL.

1,084,055.  Specification of Letters Patent.  Patented Jan. 13, 1914.

Application filed June 24, 1912.  Serial No. 705,547.

*To all whom it may concern:*

Be it known that I, THEODORE YOCHUM, a citizen of the United States, residing at Columbus, in the county of Franklin and State of Ohio, have invented certain new and useful Improvements in Resilient Wheels, of which the following is a specification.

My invention relates to resilient wheels and contemplates the provision of an improved vehicle wheel calculated to have a maximum resiliency and designed to eliminate the necessity for expensive and puncturable pneumatic tires which are at present in vogue and which are a source of great inconvenience and trouble to owners of motor vehicles on which they are most extensively used.

At the present day, pneumatic tires are utilized on practically all motor vehicles, but the cost of rubber is so great that the vehicle wheels are limited as to size in order to reduce the cost of the tires. Many efforts have been made to do away with rubber tires, by the provision of various composition materials and there have also been many efforts along the line of resilient wheels.

My invention aims to eliminate the use of these expensive outer tires by the provision of a wheel with a resilient hub structure, that is, the provision of a hub element and a rim element with an interposed resilient medium. This interposed resilient medium is desirably in the form of an annular pneumatic tube which fits with comparative freedom within a chamber formed in the hub and resiliently supports the rim thereon. The nature of my invention is such that the wheel formed is practically identical with the normal wheel in present day use, with the exception that the hub is slightly larger.

My invention is particularly effective for the reason that the wheel structure is so formed as to permit a vertical yielding reciprocation of the rim element upon its hub, but to preclude a horizontal yielding reciprocation. This is of importance since it obviates an uneven oscillation of the opposing wheels and yet retains all necessary resiliency, so that it may ride over obstacles and irregularities with an ease equivalent to the usual pneumatic tire. If I utilize a pneumatic element in the hub, it is desirably so formed that sufficient space is provided for lateral expansion under pressure.

My improvement is particularly applicable to wheels in which the wheel is driven by the rotating axle and in the production of a suitable wheel for its application, I have provided a novel and simple apparatus for automatically compensating for the shifting action which must inevitably result when the rim element yields in passing over irregularities or obstacles. This compensation is preferably effected by the provision of a stub-shaft slidably interfitting with the main axle and capable of automatically extending or retracting according to the movement of the rim element upon the hub element. In producing this result, I utilize the cap of the hub as an intermediate driving element between the axle and the rim element.

The preferred embodiment of my invention is shown in the accompanying drawings, in which similar characters of reference designate corresponding part, and in which:

Figure 1 is a side elevation of my improved vehicle wheel, Fig. 2 is a transverse section thereof, Fig. 3 is a detail view in elevation of the universal and sliding connections preferably utilized in my invention, Fig. 4 is a detail view in plan of the structure shown in Fig. 3, Fig. 5 is a detail view of the means for preventing horizontal reciprocation of the rim element upon the hub element, and, Fig. 6 is a projected view of the structure shown in Fig. 5.

In the drawings, the rim element is shown as comprising a tire 1, felly 2, spokes 3 and center portion 4. This center portion 4 is desirably cut out as at 5 and has a concavity 6 formed therein for the reception of a pneumatic tire element 7. Upon either side of this center portion 4 there is mounted a ring-like flange and these flanges are designated 8 and 9 being bolted firmly to the center portion. Superimposed upon the ring-like flange 9 is an L-shaped ring member 10 having a shoulder 11 beveled as at 12. This ring member 10 is provided with an annular threaded portion 13 upon which is adapted to be screwed a complemental bevel ring 14 which coacts with the shoulder 11 to form a ball race for a purpose to be presently described. The cone ring 14 is desirably locked in place by a washer 15. Complemental to the ball race formed and holding balls 16 therein in any suitable manner, is an annular strap member 17 having a groove therein and this strap member is desirably formed at its front and rear with integral squared formations 18 and 19. These elements constitute the main essentials of what may be termed the rim element.

The hub element comprises the metallic sleeve 20 with a disk like formation 21 integrally carried thereon and having an annular flange 22 carried thereby. This sleeve member 21 is reduced at its opposite side and threaded as at 23 for the reception of a metallic disk 24 which is threaded thereon and locked in place by a lock nut 25. The sleeve is furthermore provided at a point substantially intermediate its ends with a concavity 26. In assembled position, the hub element and particularly the sleeve 20 thereof, fits within the cutaway portion of the rim element, while the disk members 21 and 24 fit against the pieces 10 and 8 respectively. Between the sleeve and the rim element, there is located the pneumatic tire element, which resiliently maintains the normal position of the two elements with relation to each other.

The axle structure comprises a metal casing or sleeve 27 having a brake-hub formation 28 fitting within the cup formed by the annular flange 22. Superimposed upon this disk 28 and desirably formed to surround the sleeve 27 is a yoke member 29 which is rigidly secured to the disk 28 and which is provided with fingers 30 and 31 having slideways 32 and 33 for the sliding reception of the formations 18 and 19 upon the strap member 17. The operation and purpose of this will be hereinafter explained. The axle 34 passes through alining bores formed in the sleeves 20 and 27 and terminates in a universal joint structure 35 and a sleeve 36 having a diametrical key 37 passing therethrough. This sleeve 36 is adapted for the reception of a bifurcated stub shaft 38 which is enlarged as at 39 and is likewise connected by a universal joint structure 40 to a stub shaft 41 having a squared formation 42 and threaded as at 43 for the reception of a lock nut 44. This structure is shown assembled in Figs. 3 and 4 and it will be understood that the axle 34 is splined to the sleeve 20 as at 45. Thus far, the axle will appear to pass through the hub member, but so far described, is unconnected to the rim element.

The axle, the hub and the rim elements are connected together through the medium of the cap 46 which is rigidly bolted to the rim element as at 47 and which is provided with a squared aperture 48 therein, for the reception of the squared portion 42 of the stub shaft 41. The nut 44 being placed in position, the structure is rigidly connected together.

In operation, the weight upon the vehicle is transmitted from the axle to the hub and then to the rim member, being cushioned in such transmission by the pneumatic tire element. The variations of pressure and all resistance are effectually taken care of by this pneumatic tire element, but the structure shown and described in Figs. 5 and 6 effectually eliminates all cushioned movement of the rim element upon the hub element, other than vertical movement. More explicitly, it will be seen that the rim element and the hub element all rotate together, but that the rim element which is permitted to reciprocate radially with relation to the hub element, must necessarily carry the strap 17 within which it rotates. The yoke 29 with its fingers 30 and 31, however, effectually grasp the strap element 17 and, while permitting vertical movement of such strap element, absolutely precludes horizontal. Thus, the rim element may move vertically and be cushioned in such vertical movement, but may not move horizontally. The driving of my wheel is effected by a transmission from the axle to the cap 46 and thence to the rim element. In this driving action there is a continuous up and down movement of the rim element upon the hub element and this is permitted by the universal joint structure shown in Figs. 3 and 4. The up and down movement is not only permitted, but it is compensated for by the interfitting slidable joint shown and described, although it will be apparent that this interfitting slidable joint may vary as to form. In the vertical up and down movement of the rim element upon the hub element, the plate 24 is desirably in firm sliding contact with the plate 8 although such plate may be provided with anti-friction members at this point.

What I claim, is:

A resilient wheel comprising a rim element, a ring carried thereby, a hub member reciprocable within said ring, plates on said hub member and slidable against said ring, a strap, embracing and holding said ring rotatably, and a yoke embracing said strap and permitting vertical movement only of said strap and ring.

In testimony whereof I affix my signature in presence of two witnesses.

THEODORE YOCHUM.

Witnesses:
 WALTER E. L. BOCK,
 A. L. PHELPS.